United States Patent
Murthy et al.

(10) Patent No.: US 12,093,870 B2
(45) Date of Patent: Sep. 17, 2024

(54) DYNAMIC SUSTAINABILITY RISK ASSESSMENT OF SUPPLIERS AND SOURCING LOCATION TO AID PROCUREMENT DECISIONS

(71) Applicant: Tata Consultancy Services Limited, Mumbai (IN)

(72) Inventors: Swati Murthy, Bangalore (IN); Rameshwar Gongireddy, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/347,933

(22) Filed: Jun. 15, 2021

(65) Prior Publication Data
US 2022/0027810 A1   Jan. 27, 2022

(30) Foreign Application Priority Data
Jun. 15, 2020   (IN) .............................. 202021025089

(51) Int. Cl.
*G06Q 10/06*   (2023.01)
*G06F 16/215*   (2019.01)
(Continued)

(52) U.S. Cl.
CPC ....... *G06Q 10/0635* (2013.01); *G06F 16/215* (2019.01); *G06N 20/00* (2019.01);
(Continued)

(58) Field of Classification Search
None
See application file for complete search history.

(56) References Cited

U.S. PATENT DOCUMENTS

| 6,597,991 B1 * | 7/2003 | Meron ................. A01G 25/167 382/110 |
| 2013/0060598 A1 * | 3/2013 | Dudley ................. G06Q 40/08 705/7.28 |

(Continued)

FOREIGN PATENT DOCUMENTS

WO   WO 2019/073472 A1   4/2019

OTHER PUBLICATIONS

Er Kara et al., "Supplier Risk Assessment Based on Best-Worst Method and K-Means Clustering: A Case Study," Sustainability (2018).

(Continued)

*Primary Examiner* — Alan Torrico-Lopez
(74) *Attorney, Agent, or Firm* — FINNEGAN, HENDERSON, FARABOW, GARRETT & DUNNER LLP

(57) ABSTRACT

This disclosure relates generally to the dynamic sustainability risk assessment of suppliers and sourcing location to aid procurement decision. The existing solutions for sustainability risk assessment involves huge efforts in data collection, upload, consolidation from various data sources which includes sustainability impact factors. The present disclosure captures various data related to the suppliers and the sustainability impact factors from various internal and external data sources and assigns the weights to the sustainability impact factors to generate key performance indicators based on the industry segment and the data related to the suppliers. Further, the system trains an artificial intelligence model based on the key performance indicators and the data related to the suppliers using a ridge regression technique to estimate a sustainability risk assessment of the supplier. The system performs a scenario-based analysis for providing the (Continued)

recommendations to switch the commodity procurement from sourcing location to a target location.

15 Claims, 8 Drawing Sheets

(51) Int. Cl.
*G06N 20/00* (2019.01)
*G06Q 10/0635* (2023.01)
*G06Q 10/0637* (2023.01)
*G06Q 10/0639* (2023.01)
*G06Q 30/018* (2023.01)
*G06Q 30/0201* (2023.01)
*G06Q 30/0202* (2023.01)

(52) U.S. Cl.
CPC . *G06Q 10/06375* (2013.01); *G06Q 10/06393* (2013.01); *G06Q 30/018* (2013.01); *G06Q 30/0201* (2013.01); *G06Q 30/0202* (2013.01)

(56) References Cited

U.S. PATENT DOCUMENTS

| | | |
|---|---|---|
| 2013/0073387 A1 | 3/2013 | Heath |
| 2019/0182289 A1* | 6/2019 | White .................. G06N 20/00 |
| 2019/0331655 A1* | 10/2019 | Jahns .................... G06F 17/11 |
| 2020/0265357 A1* | 8/2020 | Vashistha ............... G06Q 10/08 |
| 2021/0201331 A1* | 7/2021 | Handelman ............ G06N 3/045 |

OTHER PUBLICATIONS

Osiro et al., "Evaluating supplier sustainability using fuzzy 2-tuple representation," Gestão & Produção, 28(1), e4933 (2021).
Tarhan et al., "GIS Based Risk Assessment: A Case Study of Izmir Metropolitan Area," (2006).
Wang et al., "Integrated Supplier Selection Framework in a Resilient Construction Supply Chain: An Approach via Analytic Hierarchy Process (AHP) and Grey Relational Analysis (GRA)," Sustainability (2017).
Good Practice Handbook, "Assessing and Managing Environmental and Social Risks in an Agro-Community Supply Chain," (2017).

* cited by examiner

DYNAMIC SUSTAINABILITY RISK ASSESSMENT OF SUPPLIERS AND SOURCING LOCATION TO AID PROCUREMENT DECISIONS

PRIORITY CLAIM

This U.S. patent application claims priority under 35 U.S.C. § 119 to: India Application No. 202021025089, filed on Jun. 15, 2020. The entire contents of the aforementioned application are incorporated herein by reference.

TECHNICAL FIELD

This disclosure relates generally to the field of risk and sustainability assessment, and more particularly to a system and method for dynamic sustainability risk assessment of suppliers and sourcing location to aid procurement decisions.

BACKGROUND

Sustainability risk management (SRM) is concerned with minimizing environmental and social responsibility risks to achieve an overarching business strategy that helps businesses to be sustainable and profitable in the long term. The SRM aligns profit goals with internal green strategies and policies wherein such policies seek to decrease negative environmental impact by reducing use of natural resources and decreasing carbon emissions, toxic substances, and by-products. The goal of SRM is to make this alignment efficient enough to sustain and grow a business while still preserving the environment and it is the critical part of enterprise risk management (ERM).

Sustainability-related risk from the supply chain becomes increasingly relevant to companies in many industries. One of the existing solutions for sustainability-related risk includes a framework to evaluate supply chain sustainability risk by measuring supply chain-wide operational risk, social risk, and environmental risk to form an aggregate metric. Further, a set of indicators readily available in literature are used to represent various aspects of supply chain sustainability risk. The risk assessment space and materiality analysis are used to prioritize resource allocation among supply chain stages from two distinct perspectives for mitigating supply chain sustainability risk.

However, existing solutions lacks automation of location mapping of suppliers to sustainability risk information from multiple sources. Further, existing solutions provided only siloed information on specific impacts like social risk or water risk and not on overall dynamics from sustainability perspective. Currently Consumer packaged goods (CPG) companies are looking for scalable solutions to track and improve sustainability performance across their value chain, particularly upstream sourcing and sustainability risk.

SUMMARY

Embodiments of the present disclosure present technological improvements as solutions to one or more of the above-mentioned technical problems recognized by the inventors in conventional systems. For example, in one embodiment, a method for dynamic sustainability risk assessment of suppliers and sourcing location to aid procurement decisions is provided. The method includes receiving, via one or more hardware processors, a data related to one or more suppliers, and a data related to one or more sustainability impact factors from one or more internal and external data sources wherein the one or more suppliers, the one or more sustainability impact factors are associated with an industry segment; pre-processing, via the one or more hardware processors, the data related to the one or more sustainability impact factors by performing a data validation, a data harmonization and a data curation process; assigning, via the one or more hardware processors, weights to the one or more sustainability impact factors based on the industry segment and the data related to the one or more suppliers; generating, via the one or more hardware processors, one or more key performance indictors based on the one or more sustainability impact factors along with the assigned weights using a decision matrix; training, via the one or more hardware processors, an artificial intelligence model to estimate a sustainability risk assessment for the one or more suppliers based on the data related to the one or more suppliers and the one or more key performance indicators using a ridge regression technique; performing, via the one or more hardware processors, a scenario-based analysis to provide one or more recommendations by analyzing the data related to the one or more suppliers, estimated sustainability risk assessment and the one or more key performance indicators; and providing, via the one or more hardware processors, the one or more recommendations on a user interface for switching the one or more suppliers based on the scenario-based analysis.

In another aspect, there is provided a system for dynamic sustainability risk assessment of suppliers and sourcing location to aid procurement decisions. The comprises: a memory storing instructions; one or more communication interfaces; and one or more hardware processors coupled to the memory via the one or more communication interfaces, wherein the one or more hardware processors are configured by the instructions to: receive, via the one or more hardware processors, a data related to one or more suppliers, and a data related to one or more sustainability impact factors from one or more internal and external data sources wherein the one or more suppliers, the one or more sustainability impact factors are associated with an industry segment. The system further comprises pre-processing, via the one or more hardware processors, the data related to the one or more sustainability impact factors by performing a data validation, a data harmonization and a data curation process, via one or more hardware processors; assign, via the one or more hardware processors, weights to the one or more sustainability impact factors based on the industry segment and the data related to the one or more suppliers; generate, via the one or more hardware processors, one or more key performance indictors based on the one or more sustainability impact factors along with the assigned weights using a decision matrix; train, via the one or more hardware processors, an artificial intelligence model to estimate a sustainability risk assessment for the one or more suppliers based on the data related to the one or more suppliers and the one or more key performance indicators using a ridge regression technique; perform, via the one or more hardware processors, a scenario-based analysis to provide one or more recommendations by analyzing the data related to the one or more suppliers, estimated sustainability risk assessment and the one or more key performance indicators; and providing, via the one or more hardware processors, the one or more recommendations on a user interface for switching the one or more suppliers based on the scenario-based analysis.

In yet another aspect, there are provided one or more non-transitory machine-readable information storage mediums comprising one or more instructions which when executed by one or more hardware processors cause receiving, via one or more hardware processors, a data related to one or more suppliers, and a data related to one or more sustainability impact factors from one or more internal and external data sources wherein the one or more suppliers, the one or more sustainability impact factors are associated with an industry segment; pre-processing, via the one or more hardware processors, the data related to the one or more sustainability impact factors by performing a data validation, a data harmonization and a data curation process; assigning, via the one or more hardware processors, weights to the one or more sustainability impact factors based on the industry segment and the data related to the one or more suppliers; generating, via the one or more hardware processors, one or more key performance indictors based on the one or more sustainability impact factors along with the assigned weights using a decision matrix; training, via the one or more hardware processors, an artificial intelligence model to estimate a sustainability risk assessment for the one or more suppliers based on the data related to the one or more suppliers and the one or more key performance indicators using a ridge regression technique; performing, via the one or more hardware processors, a scenario-based analysis to provide one or more recommendations by analyzing the data related to the one or more suppliers, estimated sustainability risk assessment and the one or more key performance indicators; and providing, via the one or more hardware processors, the one or more recommendations on a user interface for switching the one or more suppliers based on the scenario-based analysis.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
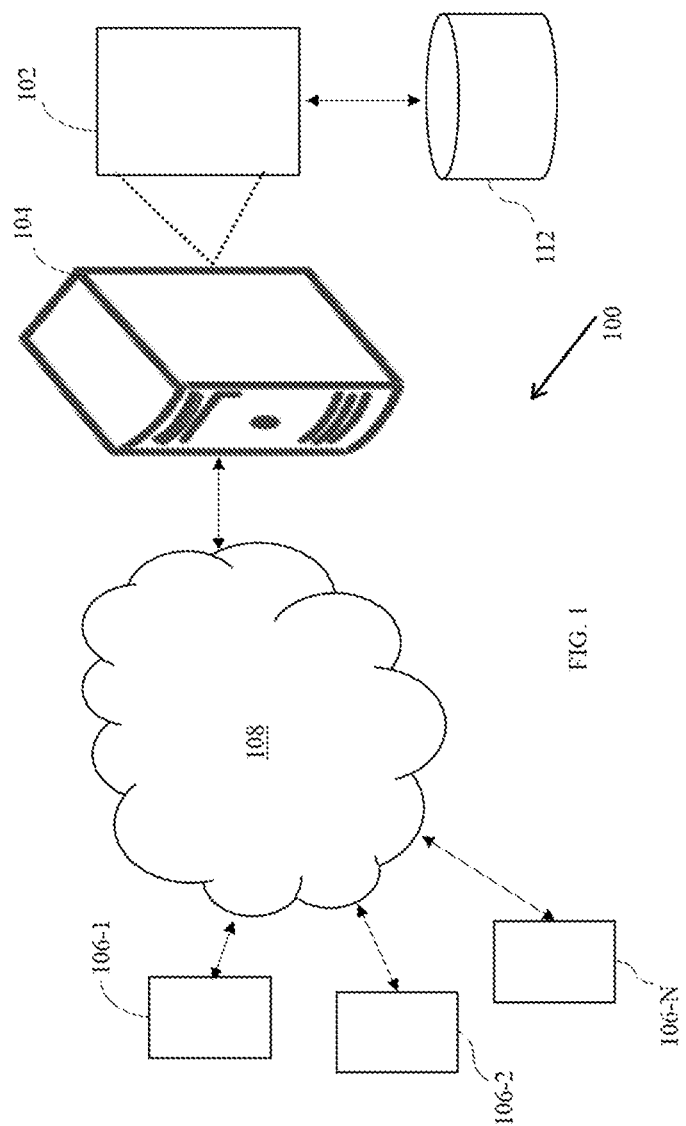
FIG. 1 illustrates an example network implementation of a system for dynamic sustainability risk assessment of suppliers and sourcing location to aid procurement decisions, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide the system and method for dynamic sustainability risk assessment of suppliers and sourcing location to aid procurement decisions. The proposed supplier sustainability framework helps to bring a change in the way the organizations collect data to assess sustainability performance and mitigate risks from agricultural commodities. Further, the proposed solution uses location mapping of a farmland related to the suppliers to calculate the key performance indicators (KPIs) using the sustainability impact factors ingested from the internal and external data sources. The proposed solution provides an automated cloud-based platform for providing validated, cleansed and harmonized real-time data from various internal and external data sources that furnish the reliable sustainability impact factors. The proposed solution further includes a scenario analysis to switch suppliers to get insights for sourcing risks and procurement planning.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an example network implementation 100 of a system 102 for dynamic sustainability risk assessment of suppliers and sourcing location to aid procurement decisions, in accordance with an example embodiment. In an embodiment, the system 102 facilitates dynamic sustainability risk assessment of suppliers and sourcing location to aid procurement decisions. Herein, a 'supplier' refers to an entity that provide goods or services to individuals or companies and a 'commodity' refers to a material which can bought or sold. Herein, a 'target location' refers to a new location of the supplier who wants to switch a commodity procurement from a sourcing location wherein the 'sourcing location' refers to the current location of the supplier to a new target location. Herein, a 'procurement decision' refers to a decision taken by the procurement team on the analysis of sustainability risks by switching commodity procurement from the supplier in the sourcing location to the supplier in the target location.

For example, consider a situation wherein the procurement decision is taken by the procurement team for switching commodity procurement from the supplier in the sourcing location to the supplier in the target location. The disclosed system 102 receives the data related to one or more suppliers in the sourcing location and one or more suppliers in the target location associated with an industry segment from the internal and external data sources and also by capturing the data from the one or more suppliers in the sourcing location and the one or more suppliers in the target location through a user interface (UI) using a natural language understanding (NLU) model. Herein, the 'industry segment' can be any type of consumer goods business which includes food and beverages, tobacco, apparel, agriculture, cosmetics, chemical and fertilizer, cocoa chocolate, fruits and vegetables, minerals, animal feed and so on. The system 102 identifies the sourcing location details of the one or more suppliers by fetching the geo-ordinates of the sourcing location, using for example, Geographic Information System (GIS) based location mapping. The system 102 further receives the sustainability impact factors specific to the industry segment by from various internal and external data sources, wherein the data related to the sustainability impact factors are captured from various internal and external data sources through Application Programming Interface (API)'s and stored in a repository. Herein the "internal data sources" comprises enterprise resource planning (ERP), procurement portals, product life cycle management systems and the "external data sources" comprises Maplecroft, WRI Aqueduct, Customer Data Platform (CDP). The details of the data ingestion of the data received from various internal and external sources into the repository is explained in the later sections in detail with reference to FIG. 3. The present system 102 calculates the weight of the sustainability impact factors based on the industry segment and data related to the one or more suppliers in the sourcing location for example, raw material. The system then generates the key performance indicators by performing a data validation, a data harmonization and a data curation on the sustainability impact factors along with the assigned weights. Further the system 102, trains an artificial intelligence to estimate a sustainability risk assessment for the one or more suppliers based on the data related to the one or more suppliers, the key performance indicators using a ridge regression technique. The system 102 further performs a scenario-based analysis by analyzing the data related to the one or more suppliers in the sourcing location and the one or more suppliers in the target location, the estimated sustainability risk assessment and the key performance indicators to switch a commodity procurement from the one or more suppliers in the sourcing location to the one or more suppliers in the target location. Finally, the system 102 provides recommendations in terms of best insights or best practices for switching the commodity from the one or more suppliers in the sourcing location to the one or more suppliers in the target location.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2A-4.

Figure 2A:
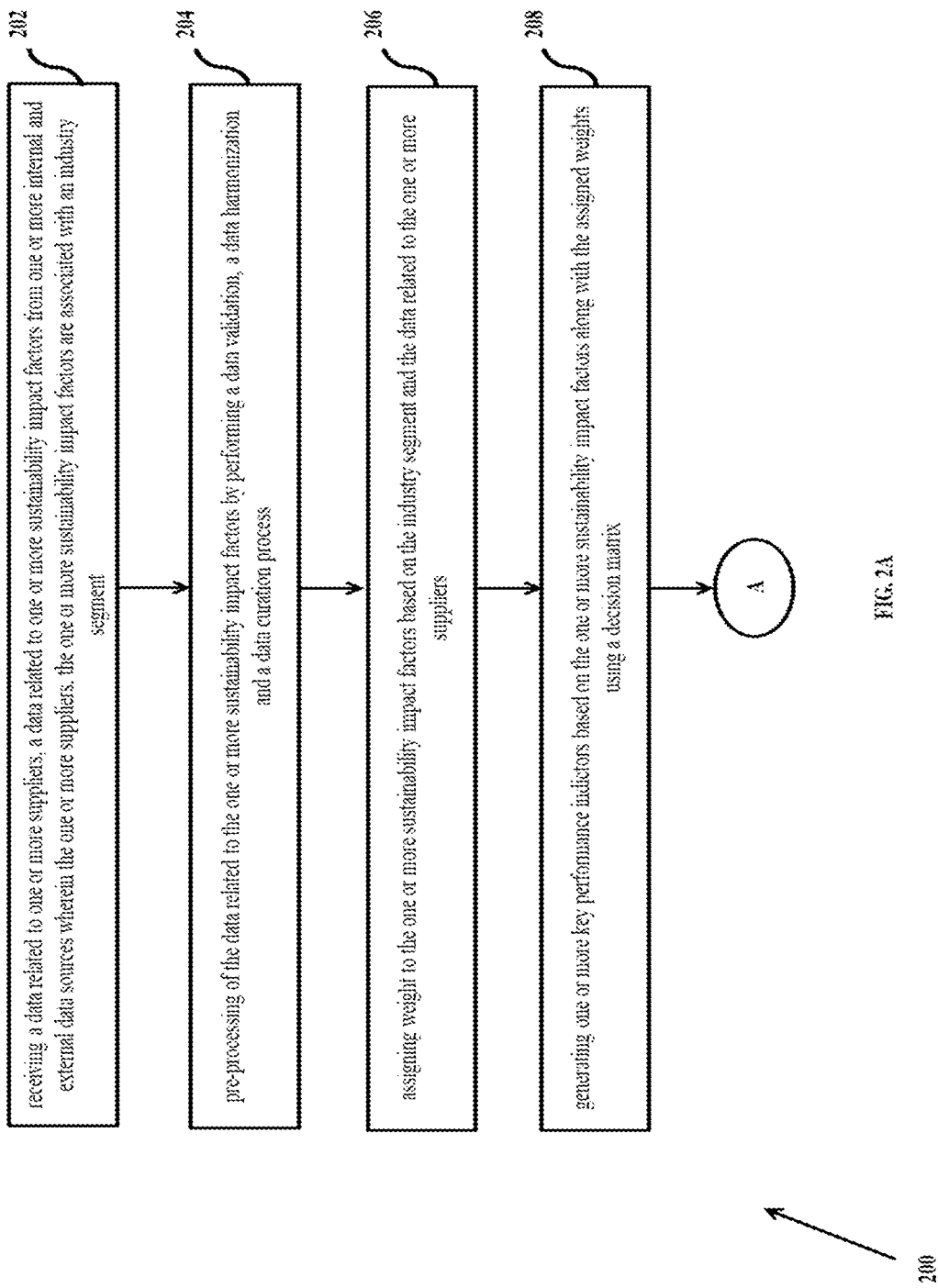
FIGS. 2A and 2B illustrates a flow diagram of a method for dynamic sustainability risk assessment of suppliers and sourcing location to aid procurement decisions according to some embodiments of the present disclosure.
Figure 2B:
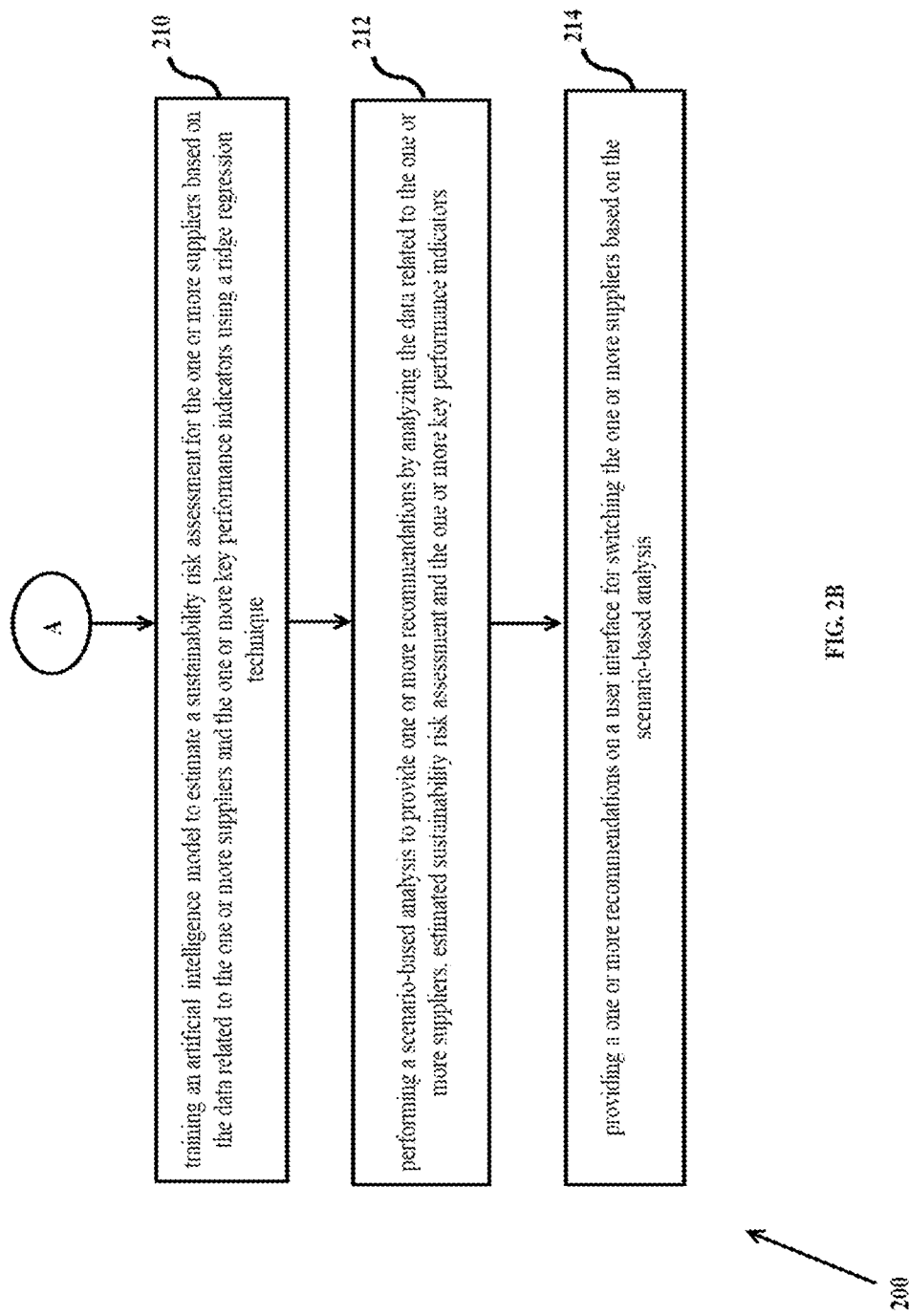

FIGS. 2A and 2B illustrates a flow diagram of a method for dynamic sustainability risk assessment of suppliers and sourcing location to aid procurement decisions according to some embodiments of the present disclosure. The method 200 depicted in the flow chart may be executed by a system, for example, the system 102 of FIG. 1. In an example embodiment, the system 102 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 102. However, the operations of the method 200 can be described and/or practiced by using any other system.

The disclosed method 200 relates to the dynamic sustainability risk assessment of suppliers and sourcing location to aid procurement decisions. At step 202, the method includes receiving a data related to one or more suppliers, one or more sustainability impact factors from one or more internal and external data sources wherein the one or more suppliers and the one or more sustainability impact factors are associated with an industry segment. The data related to the one or more suppliers includes latitudes and longitudes of the sourcing location from where a raw material is sourced, commodities, pre-harvest details, post-harvest details, storage location and products related to eco-label and certifications related to sustainability such as round table for sustainable palm oil (RSPO) or forest stewardship council (FSC) certified wood. The data related to the one or more suppliers is also captured through the user interface (UI) using the natural language understanding model. The proposed disclosure uses a conversational system which uses a natural language understanding (NLU) to capture the data related to the one or more suppliers and map the captured data to the relevant industry segment based on the inputs provided by the one or more suppliers. For example, during the capturing of data process, the conversational system asks relevant questions to the supplier. For e.g.,—

(i) What industry segment you provide services?
A) Food & Beverages B) Tobacco Industry C) Personal care D) Chemical & fertilizer manufacturer.

If the food & beverage industry is selected, then the conversational system asks the next question, (ii) What is the Raw Material?
A) Milk B) Wheat C) Sugar D) Palm oil.

If the palm oil is selected, the conversational system asks the next question, (iii) Pin your farm/mill location.

For agricultural commodities, the present solution retrieves information which includes location from where the raw material is sourced, type of fertilizers utilized, harvested date, nature of crop, baseline water stress of the location, climatic condition (i.e., temperature, humidity, etc.), location-based Greenhouse Gases (GHG) emissions, human rights risks, child labor, type of packaging material used. For non-agricultural commodities, the present solution retrieves information which includes date of manufacturing, date of expiring, date of packaged, type of packaging material used, manufacturer details, marketing partners details, sourced country details. The present disclosure captures the location details of the one or more suppliers by picking the raster data around the given radius of the one or more suppliers and identify the exact location of the one or more suppliers around the given supplier and calculates the approximate latitudes and longitudes (geo-ordinates) of the one or more suppliers.

At step 204, the method includes pre-processing of the data related to the one or more sustainability impact factors by performing a data validation, a data harmonization and a data curation process. The present disclosure provides an automated cloud-based platform for providing validated, cleansed and harmonized real-time data from various data sources that furnish reliable sustainability impact factors as explained in FIG. 3. At step 206, the method includes assigning weights to the one or more sustainability impact factors based on the industry segment and the data related to the one or more suppliers. For example, if the supplier belongs to the food and beverages (industry segment) and raw material of the supplier include sugar which is a water-intensive raw material, while calculating the weight, more weightage is provided for water stress. Further if the supplier belongs to the dairy and dry food industry, while calculating the weight, more weightage is provided to carbon emissions. Similarly, if the supplier belongs to the apparel type of industry, more wight is provided for child labor and human rights risk impact factors. At step 208, the method includes generating one or more key performance indictors based on the one or more sustainability impact factors along with the assigned weights using a decision matrix. For example, if the supplier is related/belongs to the food & beverages segment, with the help of a decision matrix, the system captures all the relevant sustainability impact factors like Baseline Water Stress, Greenhouse Gases (GHG) Emissions, Water withdrawal, Human rights risks, child labor, LULUC (land use & land use change), Round Table for Sustainable Palm Oil (RSPO) Certifications and Universal Trade Zone (UTZ) certification along with their industry segment specific weights for e.g., low, medium and high.

TABLE 1

Sample decision matrix to generate KPI's.
Sample decision matrix

| O-Zone KPIs | Weights | Food & Beverages | Chemical & Fertilizers | Tobacco | Personal care Products |
|---|---|---|---|---|---|
| Baseline water stress | Low | ✓ | | | ✓ |
| GHG Emissions | High | ✓ | ✓ | ✓ | ✓ |
| Water withdrawal | High | ✓ | ✓ | | ✓ |
| Human Rights Risk | Medium | ✓ | | ✓ | ✓ |
| Child labour | High | ✓ | | ✓ | ✓ |
| LULUC (Land use & Land Use Change) | High | ✓ | | | ✓ |
| RSPO Certification | Medium | ✓ | | | ✓ |
| UTZ Certification | Medium | ✓ | | | |

TABLE 2

Various Key performance indicators and their generation/calculation details.

| Sl.no | Sustainability impact factors | Full form | Calculations |
|---|---|---|---|
| 1 | GHG | Greenhouse Gas | Greenhouse Gas = GHG impact factor × Location Tonnage |
| 2 | LULUC | GHG from Land Use Change | GHG from Land Use Change = LUC impact factor × Location Tonnage |
| 3 | GHG Total | GHG Total | GHG Total = Greenhouse Gas + GHG from Land Use Change |
| 4 | WW | Water Withdrawal | Water Withdrawal = WDL impact factor × Location Tonnage |

TABLE 2-continued

Various Key performance indicators and their generation/calculation details.

| Sl.no | Sustainability impact factors | Full form | Calculations |
|---|---|---|---|
| 5 | WC | Water Consumption | Water Consumption = H2O impact factor x Location Tonnage |
| 6 | Withdrawal in excess of program | Withdrawal in excess of program | Withdrawal in excess of program = Water Withdrawal - Program water withdrawal |
| 7 | Land | Land | Land = LND impact factor * location tonnage |
| 8 | Water Withdrawal Impact Factor | Water Withdrawal Impact Factor | Water Withdrawal Impact Factor = WDL Impact factor from IFM import table |
| 9 | Water Consumption | Water Consumption | Water Consumption = H2O impact factor x Location Tonnage |
| 10 | Yield | Yield | Yield = YLD impact factor from Impact Factor Manager data import |
| 11 | HRR | Human Rights Risk | Consists of an indicator showing "High", "Medium" or "Low". This is based solely on the country of origin irrespective of the sourced material and as such must be pulled from a separate table with every countries HRR value. |
| 12 | Water Withdrawal from Land in Program | Water Withdrawal from Land in Program | If program land area != 0 and program land area < Land then program water withdrawal impact factor × program tonnes, else = water withdrawal total |
| 13 | BWS | Baseline water stress | "The weighted mean indicator value (sr) was then computed by multiplying the gridded indicator (sp) by the weight (wp), summing, and dividing by the sum of the weights across the entire administrative region (r)." administrative region (r) = Supply shed area (this can either be a state or province as found in the natural earth "ne_10m_admin_1_states_provinces_lakes_shp" shapefile or it can be a radius generated from a supply shed point provided in the import template. ... gridded indicator (sp) = BWS value. Each pixel and its associated agriculture percentage in the agricultural raster file that fall within the supply shed area should be multiplied by the BWS indicator value it falls within in the aqueduct vector shapefile summed and divided by the sum of the agriculture pixel land area percentages that fall within the supply shed vector. As per the following formula: $$\int S_r = \frac{(\Sigma_{p=r} W_p S_p)}{(\Sigma_{p=r} W_p)}$$ |
| 14 | Child labor | Child labor | Consists of an indicator showing "High", "Medium" or "Low". This is based solely on the country of origin irrespective of the sourced material and as such must be pulled from a separate table with every country's child labor value. |

At step 210, the method includes training an artificial intelligence model to estimate a sustainability risk assessment for the one or more suppliers based on the data related to the one or more suppliers and the one or more key performance indicators using a ridge regression technique (known in the art). In the present disclosure, the ridge regression technique is used to do sustainability risk assessment to validate environmental, social and governance measures of the one or more suppliers in the sourcing location and the one or more suppliers in the target location.
For Example, $Y = (1.23*x1) + (0.34*x2) + (1.31*x3) + 0.45$ Y is output of sustainability risk of the supplier,
x1 is weightage input of Environmental impact of the supplier,
x2 is weightage of Social impact of the supplier,
x3 is weightage of Governance impact the of supplier)
The equation may vary for the different segments because of how they prioritize the Environmental, Social and Governance (ESGs).

At step 212, the method includes performing a scenario-based analysis to provide one or more recommendations by analyzing the data related to the one or more suppliers, estimated sustainability risk assessment and the one or more key performance indicators. The present disclosure performs the scenario analysis for each industry segment based on the estimation of supplier's sustainability assessment to provide recommendations for switching of the one or more suppliers from the sourcing location to the target location. The present disclosure analyses various data while performing the scenario-based analysis which includes supplier name, sourcing location data, supplier distance, raw material, quantity of raw material, harvest date details, estimated sustainability risk, environmental risk, social risk, governance risk and related factors. At step 214, the method includes providing a one or more recommendations on a user interface (UI) for switching the one or more suppliers based on the scenario-based analysis. The present disclosure provides the best recommendations on the user interface (UI) related to suppliers based on the scenario-based analysis.

For example, consider a customer named "Cum_01" is procuring wheat from the supplier named "Sup_01". Once the supplier ("Sup_01") is onboarded into the system 102, the present solution measures the sustainability risk assessment of the supplier whose risk value is 4.31. Similarly, the sustainability risk assessment of other suppliers whose sustainability risks are measured already. On considering the various key parameters as shown in the below table, the present disclosure performs scenario-based analysis to provide best alternative to wheat supplier "Sup_01" for switching of supplier for new procurement scenario planning from the sourcing location to the target location.

by web scraping techniques such as web crawlers or DOM (Document Object Model) parsing. Internal data which includes commodity and raw materials are ingested using automation techniques such as kinetic firehouse that scale automatically. Wherever relevant, location mapping is done to integrate geo coordinate based sustainability impact factors with values derived from buffer and overlay point-in-polygon analysis of variables related to the target location which includes crop density and farm area to construct an AI (artificial intelligence) model that can return the weighted risk according to the type and volume of commodity sourced. Map mashups are created to give a dynamic view

TABLE 3

Use case for scenario-based analysis.

| Supplier Name | Latitudes | Longitudes | Distance from supplier (in Km) | Raw material | Quantity (tons) | Next harvest date | Sustainbility risk | Environmental risk | Social risk | Governance risk | Other factors |
| --- | --- | --- | --- | --- | --- | --- | --- | --- | --- | --- | --- |
| Sup_01 | −23.5458 | −47.18333 | 120 | Wheat | 4566 | 20 Jun. 2021 | 4.31 | 1.21 | 2.12 | 0.12 | 0.86 |
| Sup_02 | 3.1501 | 101.70835 | 322 | Wheat | 4323 | 12 Aug. 2021 | 2.23 | 0.13 | 1.01 | 0.50 | 0.59 |
| Sup_03 | 38.6483 | −90.53061 | 432 | Wheat | 2346 | 14 Jun. 2021 | 2.53 | 0.70 | 1.21 | 0.30 | 0.32 |
| Sup_04 | 34.3946 | 135.32273 | 543 | Wheat | 5432 | 01 Sep. 2021 | 2.64 | 1.12 | 1.34 | 0.10 | 0.08 |
| Sup_05 | 41.8866 | −87.63054 | 102 | Wheat | 6775 | 07 Aug. 2021 | 3.12 | 1.12 | 1.56 | 0.42 | 0.02 |

Figure 3:
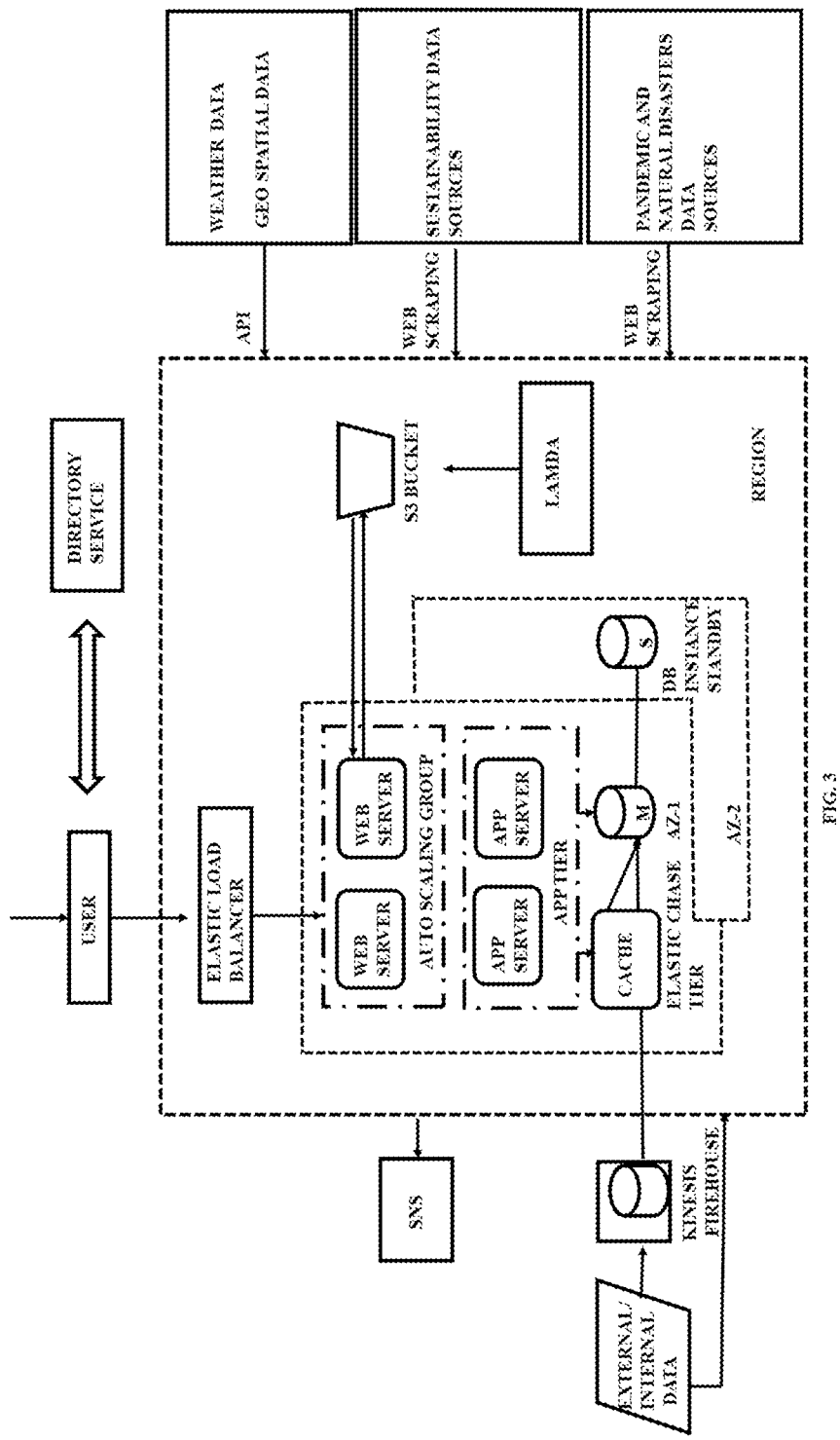
FIG. 3 is a block diagram illustrating a process flow of data ingestion associated with the method for dynamic sustainability risk assessment of suppliers and sourcing location to aid procurement decisions according to some embodiments of the present disclosure.

FIG. 3 is a block diagram illustrating the flow of data ingestion involved in the method for dynamic sustainability risk assessment of suppliers and sourcing location to aid procurement decisions according to some embodiments of the present disclosure. In an embodiment, the present solution includes the ingestion of data related to the sustainability impact factors from various internal and external data sources to generate the key performance indicators. The data from various internal and external data sources includes weather data, geo spatial data, sustainability data sources, pandemic and natural disasters data sources. In an embodiment, the weather data is captured to monitor temperature and humidity to mitigate health risks related to food toxicity and contamination—For e.g., high humidity promotes growth of mold, bacteria, pests that cause crop failure due to root or crown rots during both pre-harvest and post-harvest periods in food crops which includes corn. Further, geo spatial data is captured to map geo-coordinate details of the supplier farms i.e., target location to predict weather, sustainability, pandemic, natural disaster risks associated with location data available at various spatial resolutions in the different data sources. Similarly, the sustainability data estimate risk from 100+ indices related to environment, social and economic impacts sourced from a plurality of external agencies. Further, disease outbreak data forecast supply chain disruption risk from disease outbreaks which includes pandemic and endemic depending on the geographical locations of supplier or farms wherein disasters data sources predict supply chain disruption risk from possibility of floods, cyclones, droughts in the supplier or farm locations. An Internal/External Data XML/JSON module in FIG. 3 gets internal data on type and volumes of commodities and raw materials sourced by an organization which includes details of suppliers, details of commercial and small holding farmers and their farm location and size in various parts of the world. Herein, the 'organization' refers to consumer goods industry. In an embodiment, weather and geo spatial data is ingested using APIs (Application Programming Interface). Further, the sustainability impact factors, disease and disaster risk probability data are ingested of location-based risks. Further a natural language understanding (NLU) based artificial intelligence (AI) model is created to aid procurement decisions to avoid upstream supply chain disruptions by forecasting alternate supplier scenarios to meet sustainability goals.

Figure 4:
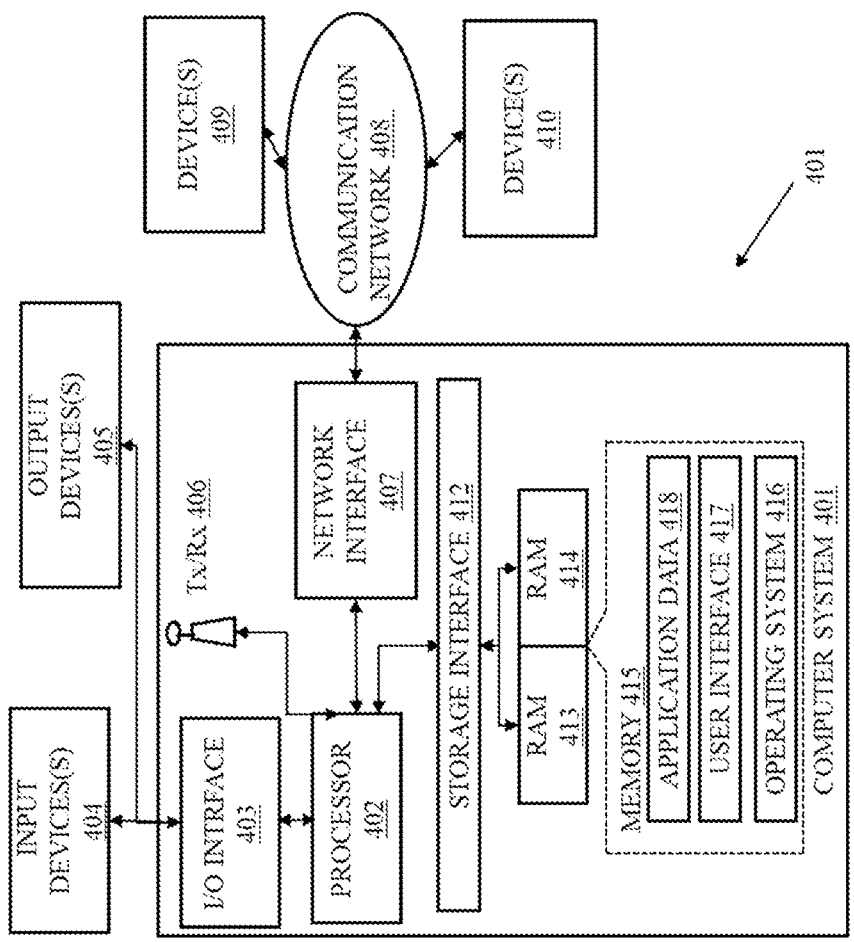
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the devices included in this disclosure. Computer system 401 may comprise a central processing unit ("CPU" or "hardware processor") 402. The hardware processor 402 may comprise at least one data processor for executing program components for executing user- or system generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™' ARM's application, embedded or secure processors, IBM PowerPC™, Intel's Core, Itanium™, Xeon™, Celeron™ or other line of processors, etc. The processor 402 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 402 may be a multi-core multi-threaded processor.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409 and 410. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 416, user interface application 417, user/application data 418 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 401 may store user/application data 418, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation.

Figure 5A:
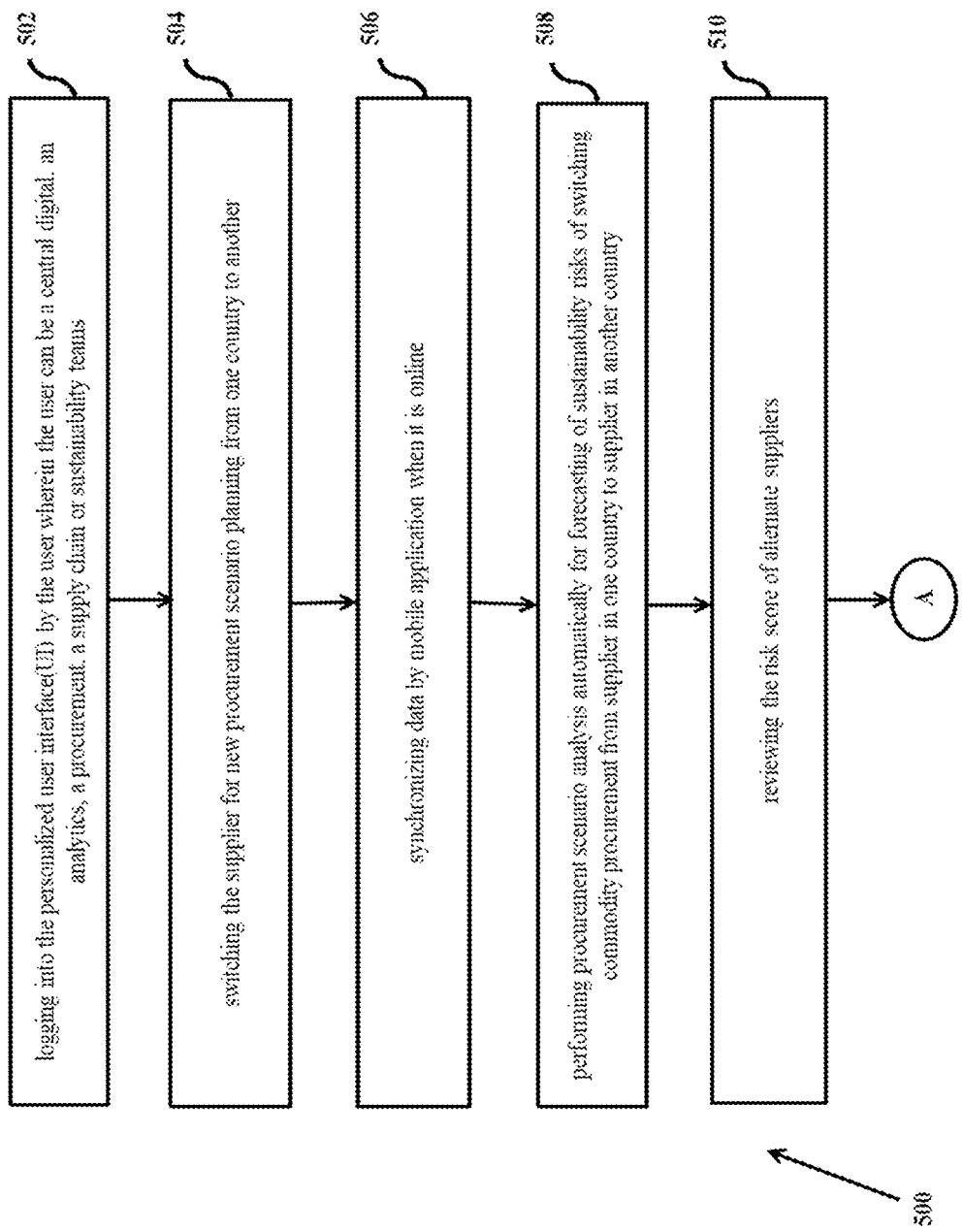
FIGS. 5A and 5B are flowcharts illustrating a use case example for the dynamic sustainability risk assessment of suppliers and sourcing location to aid procurement decisions according to some embodiments of the present disclosure.
Figure 5B:
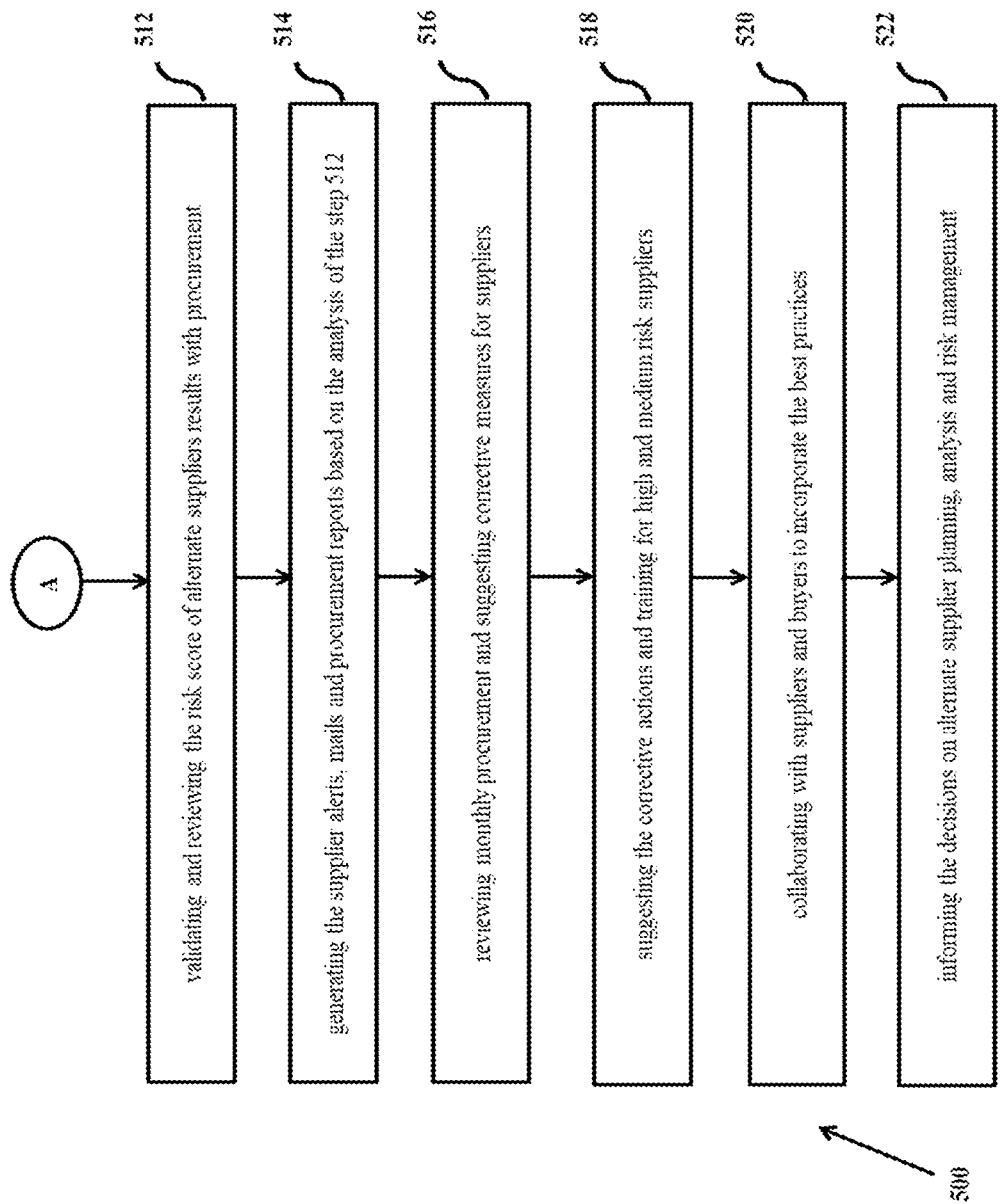

FIGS. 5A and 5B are flowcharts illustrating a use case example for the dynamic sustainability risk assessment of suppliers and sourcing location to aid procurement decisions according to some embodiments of the present disclosure. The present example refers to a scenario where procurement decision is taken by the procurement team for switching commodity procurement from the supplier in the sourcing location to the supplier in target location. Herein the use case the 'target location' is referred as 'new farm'.

In an embodiment, at step 502, the user login into a personalized user interface (UI) of a user device, for example the device 106 (FIG. 1). The user can be a central digital, analytics, a procurement, a supply chain or sustainability teams. At step 504, the user switches the supplier for new procurement scenario planning from current location i.e., sourcing location to target location. At step 506, data related to procurement decision is synchronized by mobile application when it is online. At step 508, the proposed solution provides procurement scenario analysis automatically for forecasting of sustainability risks of switching commodity procurement from the supplier in the sourcing location to the supplier in target location. In one example embodiment, procurement scenario analysis automation for estimation of sustainability risks from switching commodity procurement from supplier 'A' in sourcing location to supplier 'B' in target location is performed by automatically capturing the geo-coordinates of the new farm from its address using a mobile application. The proposed solution then maps the geo coordinates data using Geographic Information System (GIS) on vector data of baseline water stress value and returns the BWS value of the respective geo coordinates of farms. Further, the proposed solution provides gathering of gridded weights values of cropland from agricultural area raster data and also gathers the supplier farm location and states, provinces from natural earth vector data. Further, buffer and overlay analysis is performed and integrated BWS value is generated based on the intersected aqueduct BWS polygon layer. Further, the proposed solution estimates the sustainability risk assessment through weighted risk calculation method by training the artificial intelligence (AI) model through ridge regression or classification analysis. Finally, commodity tonnage data is integrated and an overall percentage increase or decrease in risk is returned for switching to from supplier 'A' to supplier 'B'. At step 510 the risk score of alternate suppliers i.e., supplier 'B' is reviewed. At step 512, risk score of alternate suppliers i.e., supplier 'B' results are validated and reviewed with procurement. At step 514, supplier alerts, mails and procurement reports are generated based on the analysis of the step 512. At step 516, monthly procurement is reviewed, and corrective measures are suggested for suppliers. At step 518, corrective actions are suggested and trained for high and medium risk suppliers. At step 520, the proposed solution enables collaboration with suppliers and buyers to incorporate the best practices. At step 522, decisions on alternate supplier planning, analysis and risk management are informed.

Figure 6:
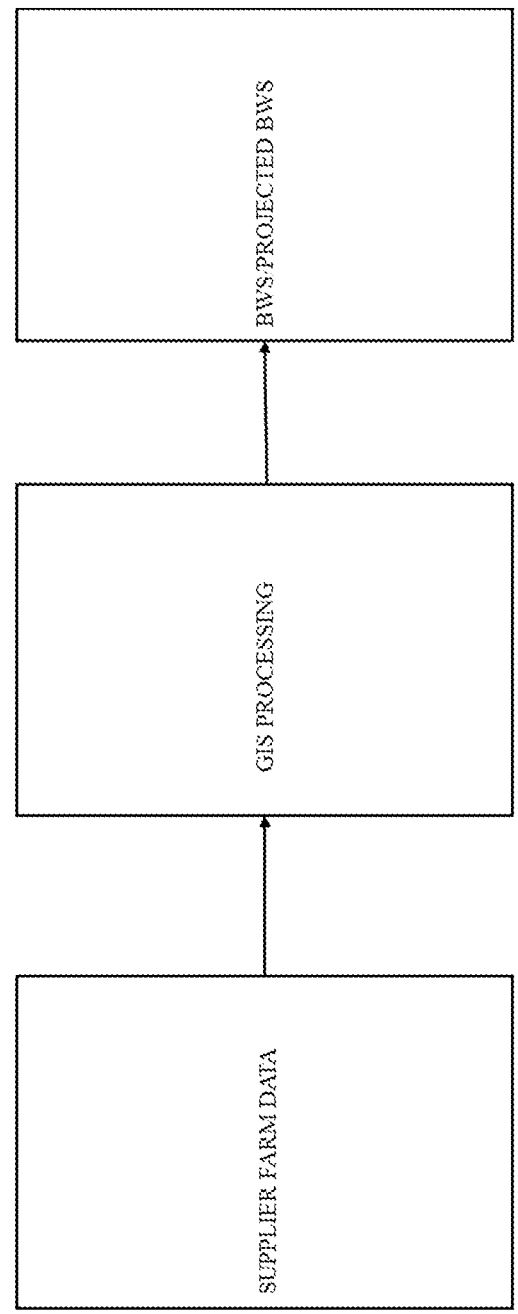
FIG. 6 is a use case example illustrating the calculation of Baseline Water Stress (BWS) which is a key performance indicator explained in conjunction with the system and method for dynamic sustainability risk assessment of suppliers and sourcing location to aid procurement decisions according to some embodiments of the present disclosure.

FIG. 6 is a block diagram illustrating the calculation of Baseline Water Stress (BWS) which is a sustainability impact factor specific to an industry segment according to some embodiments of the present disclosure. The present disclosure maps the geo coordinate data using for example, GIS (Geographic Information System) on vector data of baseline water stress value in the water stress projections data and returns gathering of gridded weights values of the target location. The present disclosure further gathers the supplier target location and states, provinces from natural earth vector data wherein gathering/capturing the target location data includes extracting target location data, collecting point with radius and extracting data related to city/country/province/state/region of the target location, performing buffer and overlay analysis. Herein, buffer and overlay analysis is required to map 3 types of data files related to the target location, for example, data files which includes vector files from aqueduct, raster files from crop intensity satellite maps and farm location radius. The present disclosure utilizes Geographic Information system (GIS) for performing buffer and overlay analysis which gives an accurate view of the water stress in the target location. For example, consider a farm area, wherein the water stress of the farm area depends on the type of crop grown and size of the farm. Further the present disclosure returns integrated BWS value based on the intersected aqueduct BWS Polygon Layer. Further, the exact BWS value is calculated based on the intersected aqueduct BWS polygon layer using the below equation.

$$\text{Avg. } BWS \text{ calculation} = \int S_r = \frac{(\Sigma_{p=r} W_p S_p)}{(\Sigma_{p=r} W_p)}$$

Where, $s_r$ is mean indicator value,
$s_p$ is Raw BWS values,
$w_p$ is Cropland Gridded Values, The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence, a system and method for dynamic sustainability risk assessment of suppliers and sourcing location to aid procurement decisions is disclosed. The proposed disclosure is a digital solution which helps in dynamic supplier switching to return impacts of different procurement decisions across multiple risk impact factors through advanced analytics i.e., the proposed solution provides a digital framework to give useful insights on sustainability risks from suppliers. The proposed digital solution reduces the effort required for data collection, upload, consolidation and analytics by almost 80% through process automation, artificial intelligence (AI) analytical data models. The proposed disclosure utilizes a natural language understanding (NLU) AI algorithm to intelligently map the industry to right set of sustainability impact factors and assign relevant weights as per use case definition. Further, the proposed disclosure forecast the risk for each sustainability impact factors and also estimate overall risk through weighted risk calculation method by training the artificial intelligence (AI) model through ridge regression or classification analysis.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
receiving, via one or more hardware processors, data related to one or more suppliers, and data related to one or more sustainability impact factors from one or more internal data sources and one or more external data sources wherein the one or more suppliers, the one or more sustainability impact factors are associated with an industry segment;
pre-processing, via the one or more hardware processors, the data related to the one or more sustainability impact factors by performing a data validation, a data harmonization and a data curation process;
assigning, via the one or more hardware processors, weights to the one or more sustainability impact factors based on the industry segment and the data related to the one or more suppliers;
generating, via the one or more hardware processors, one or more key performance indictors based on the one or more sustainability impact factors along with the assigned weights using a decision matrix;
training, via the one or more hardware processors, an artificial intelligence model to estimate a sustainability risk assessment for the one or more suppliers based on the data related to the one or more suppliers and the one or more key performance indicators using a ridge regression technique, wherein the sustainability risk assessment is estimated by forecasting risk for the one or more sustainability impact factors through a weighted risk calculation method, wherein the artificial intelligence model returns the weighted risk according to type and volume of commodity sourced;
performing, via the one or more hardware processors, a scenario-based analysis to provide one or more recommendations by analyzing the data related to the one or more suppliers, estimated sustainability risk assessment and the one or more key performance indicators, wherein the scenario-based analysis is performed by automatically capturing geo-coordinates and mapping data from the geo-coordinates using Geographic Information System (GIS) on vector data of baseline water stress value (BWS);
providing, via the one or more hardware processors, the one or more recommendations on a user interface for switching the one or more suppliers based on the scenario-based analysis, wherein the user interface is a personalized user interface (UI) and logging into the UI by a user, and the user is at least one of a central digital, analytics, a procurement, a supply chain and sustainability teams;
utilizing, via the one or more hardware processors, a natural language understanding (NLU) AI algorithm to intelligently map the industry segment to the one or more sustainability impact factors and assign relevant weights as per use case definition, wherein the (NLU) based artificial intelligence (AI) algorithm is created to aid procurement decisions to avoid upstream supply chain disruptions by forecasting alternate supplier scenarios to meet sustainability goals;
creating, via the one or more hardware processors, map mashups to provide a dynamic view of location based risks based on the industry segment;
performing, via the one or more hardware processors, location mapping to integrate geo coordinate based sustainability impact factors with values derived from buffer and overlay point-in-polygon analysis of variables related to a target location;
using, via the one or more hardware processors, a conversational system based on the NLU AI algorithm to capture data related to the one or more suppliers;
capturing, via the one or more hardware processors, exact location details of the one or more suppliers by picking raster data around given radius of the one or more suppliers; and
providing via the one or more hardware processors, validated, cleansed and harmonized real-time data from the one or more external and internal data sources.

2. The processor implemented method of claim 1, wherein the step of receiving the data related to one or more suppliers further includes capturing the data through the user interface using a natural language understanding model.

3. The processor implemented method of claim 1, wherein the data related to one or more suppliers comprises data related to industry segment, raw material, sourcing location, commodity, pre-harvest data, post-harvest data, storage location and products related to eco-label and certifications related to sustainability.

4. The processor implemented method of claim 3, where the data related to the sourcing location of the one or more suppliers is obtained by at least one of:
receiving the sourcing location from the one or more internal and external data sources; and
identifying the sourcing location by fetching geo-coordinates of the sourcing location based on the data related to one or more suppliers.

5. The processor implemented method of claim 1, wherein the one or more sustainability impact factors from one or more internal and external data sources comprises of BWS (Baseline Water Stress), HRR (Human Right Risks), Child Labor, Gender Equality, Corruption, GHG (Greenhouse gases) Emissions.

6. A system, comprising:
a memory storing instructions;
one or more communication interfaces; and
one or more hardware processors coupled to the memory via the one or more communication interfaces, wherein the one or more hardware processors are configured by the instructions to:
receive, data related to one or more suppliers, and a data related to one or more sustainability impact factors from one or more internal and external data sources wherein the one or more suppliers, the one or more sustainability impact factors are associated with an industry segment;
pre-process the data related to the one or more sustainability impact factors by performing a data validation, a data harmonization and a data curation process, via one or more hardware processors;
assign weights to the one or more sustainability impact factors based on the industry segment and the data related to the one or more suppliers;
generate one or more key performance indictors based on the one or more sustainability impact factors along with the assigned weights using a decision matrix;
train an artificial intelligence model to estimate a sustainability risk assessment for the one or more suppliers based on the data related to the one or more suppliers and the one or more key performance indicators using a ridge regression technique, wherein the sustainability risk assessment is estimated by forecasting risk for the one or more sustainability impact factors through a weighted risk calculation method, wherein the artificial intelligence model returns the weighted risk according to type and volume of commodity sourced;
perform, a scenario-based analysis to provide one or more recommendations by analyzing the data related to the one or more suppliers, estimated sustainability risk assessment and the one or more key performance indicators,wherein the scenario-based analysis is performed by automatically capturing geo-coordinates and mapping data from the geo-coordinates using Geographic Information System (GIS) on vector data of Baseline Water Stress Value (BWS);
provide the one or more recommendations on a user interface for switching the one or more suppliers based on the scenario-based analysis, wherein the user interface is a personalized user interface (UI) and logging into the UI by an user, and the user is at least one of a central digital, analytics, a procurement, a supply chain and sustainability teams;
utilize a natural language understanding (NLU) AI algorithm to intelligently map the industry segment to the one or more sustainability impact factors and assign relevant weights as per use case definition, wherein the (NLU) based artificial intelligence (AI) algorithm is created to aid procurement decisions to avoid upstream supply chain disruptions by forecasting alternate supplier scenarios to meet sustainability goals;
creating, via the one or more hardware processors, map mashups to provide a dynamic view of location based risks based on the industry segment;
performing, via the one or more hardware processors, location mapping to integrate geo coordinate based sustainability impact factors with values derived from buffer and overlay point-in-polygon analysis of variables related to a target location;
use a conversational system based on the NLU AI algorithm to capture data related to the one or more suppliers;
capture the one or more hardware processors, exact location details of the one or more suppliers by picking raster data around given radius of the one or more suppliers; and
provide validated, cleansed and harmonized real-time data from the one or more external and internal data sources.

7. The system of claim 6, wherein the data related to one or more suppliers is captured through the user interface using a natural language understanding model.

8. The system of claim 6, wherein the data related to one or more suppliers comprises data related to the industry segment, raw material, sourcing location, commodity, pre-harvest data, post-harvest data, storage location and products related to eco-label and certifications related to sustainability such as round table for sustainable palm oil (RSPO) or forest stewardship council (FSC) certified wood.

9. The system of claim 8, where the data related to the sourcing location of the one or more suppliers is obtained by at least one of:
receiving the sourcing location from the one or more internal and external data sources; and
identifying the sourcing location by fetching geo-coordinates of the sourcing location based on the data related to one or more suppliers.

10. The system of claim 6, wherein the one or more sustainability impact factors from one or more internal and external data sources comprises of BWS (Baseline Water Stress), HRR (Human Right Risks), Child Labor, Gender Equality, Corruption, GHG (Greenhouse gases) Emissions.

11. One or more non-transitory machine-readable information storage mediums comprising one or more instructions which when executed by one or more hardware processors cause:
receiving data related to one or more suppliers, and data related to one or more sustainability impact factors from one or more internal data sources and one or more external data sources wherein the one or more suppliers, the one or more sustainability impact factors are associated with an industry segment;
pre-processing the data related to the one or more sustainability impact factors by performing a data validation, a data harmonization and a data curation process;
assigning weights to the one or more sustainability impact factors based on the industry segment and the data related to the one or more suppliers;
generating one or more key performance indictors based on the one or more sustainability impact factors along with the assigned weights using a decision matrix;
training an artificial intelligence model to estimate a sustainability risk assessment for the one or more suppliers based on the data related to the one or more suppliers and the one or more key performance indicators using a ridge regression technique, wherein the sustainability risk assessment is estimated by forecasting risk for the one or more sustainability impact factors through a weighted risk calculation method, wherein the artificial intelligence model returns the weighted risk according to type and volume of commodity sourced;

performing a scenario-based analysis to provide one or more recommendations by analyzing the data related to the one or more suppliers, estimated sustainability risk assessment and the one or more key performance indicators, wherein the scenario-based analysis is performed by automatically capturing geo-coordinates and mapping data from the geo-coordinates using Geographic Information System (GIS) on vector data of baseline water stress value (BWS);

providing the one or more recommendations on a user interface for switching the one or more suppliers based on the scenario-based analysis, wherein the user interface is a personalized user interface (UI) and logging into the UI by an user, and the user is at least one of a central digital, analytics, a procurement, a supply chain and sustainability teams;

utilizing, via the one or more hardware processors, a natural language understanding (NLU) AI algorithm to intelligently map the industry segment to the one or more sustainability impact factors and assign relevant weights as per use case definition, wherein the (NLU) based artificial intelligence (AI) algorithm is created to aid procurement decisions to avoid upstream supply chain disruptions by forecasting alternate supplier scenarios to meet sustainability goals;

creating, via the one or more hardware processors, map mashups to provide a dynamic view of location based risks based on the industry segment;

performing, via the one or more hardware processors, location mapping to integrate geo coordinate based sustainability impact factors with values derived from buffer and overlay point-in-polygon analysis of variables related to a target location;

using, via the one or more hardware processors, a conversational system based on the NLU AI algorithm to capture data related to the one or more suppliers;

capturing, via the one or more hardware processors, exact location details of the one or more suppliers by picking raster data around given radius of the one or more suppliers; and providing via the one or more hardware processors, validated, cleansed and harmonized real-time data from the one or more external and internal data sources.

12. The one or more non-transitory machine readable information storage mediums of claim 11, wherein the step of receiving the data related to one or more suppliers further includes capturing the data through the user interface using a natural language understanding model.

13. The one or more non-transitory machine readable information storage mediums of claim 11, wherein the data related to one or more suppliers comprises data related to the industry segment, raw material, sourcing location, commodity, pre-harvest data, post-harvest data, storage location and products related to eco-label and certifications related to sustainability such as round table for sustainable palm oil (RSPO) or forest stewardship council (FSC) certified wood.

14. The one or more non-transitory machine readable information storage mediums of claim 13, where the data related to the sourcing location of the one or more suppliers is obtained by at least one of:
receiving the sourcing location from the one or more internal and external data sources; and
identifying the sourcing location by fetching geo-coordinates of the sourcing location based on the data related to one or more suppliers.

15. The one or more non-transitory machine readable information storage mediums of claim 11, wherein the one or more sustainability impact factors from one or more internal and external data sources comprises of BWS (Baseline Water Stress), HRR (Human Right Risks), Child Labor, Gender Equality, Corruption, GHG (Greenhouse gases) Emissions.

* * * * *